US008234092B2

United States Patent
Yang et al.

(10) Patent No.: US 8,234,092 B2
(45) Date of Patent: Jul. 31, 2012

(54) DUAL CROSS BEAM SENSOR SYSTEM AND METHOD FOR MEASURING LEAD EDGE AND/OR TRAIL EDGE MEDIA CURL

(75) Inventors: Ming Yang, Fairport, NY (US); Thomas Jay Wyble, Williamson, NY (US); Keith Andrew Buddendeck, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 261 days.

(21) Appl. No.: 12/701,188

(22) Filed: Feb. 5, 2010

(65) Prior Publication Data

US 2011/0196650 A1   Aug. 11, 2011

(51) Int. Cl.
*G01B 5/20* (2006.01)
*G01B 11/24* (2006.01)

(52) U.S. Cl. ........ 702/166; 702/142; 702/155; 702/167; 356/621; 399/406

(58) Field of Classification Search ............... 702/142, 702/155, 167; 356/621; 399/406
See application file for complete search history.

(56) References Cited

U.S. PATENT DOCUMENTS

| 4,926,538 | A | 5/1990 | Bond et al. .......... 29/559 |
| 6,668,155 | B1 | 12/2003 | Hubble, III et al. .......... 399/406 |
| 7,545,519 | B2 | 6/2009 | Ossman et al. .......... 356/625 |
| 2008/0018913 | A1 | 1/2008 | Ossman et al. .......... 356/625 |
| 2008/0019751 | A1* | 1/2008 | Castillo et al. .......... 399/406 |
| 2009/0003896 | A1 | 1/2009 | Domoto et al. .......... 399/323 |
| 2011/0157604 | A1* | 6/2011 | Wyble et al. .......... 356/621 |

* cited by examiner

*Primary Examiner* — Andrew Schechter
*Assistant Examiner* — L. Anderson
(74) *Attorney, Agent, or Firm* — Kermit D. Lopez; Luis M. Ortiz; Melissa Asfahani

(57) ABSTRACT

A system and method for measuring a lead edge and/or a trail edge media curl utilizing a dual cross beam sensor. The dual cross beam sensor includes one or more pairs of emitters (e.g., a pair to two pairs of emitters) and one or more detectors positioned sequentially in a media path so that a media passes via dual cross beams. Timing data with respect to the media can be measured as the media crosses via the dual cross beam sensor from a leading edge and/or trailing edge. A true instantaneous media speed and a curl height (i.e., media tip height or media curvature) can be simultaneously calculated from the timing data associated with the lead edge/trail edge with respect to each single cross beams of the dual cross beam sensor. An average curl height can be then calculated to enhance the accuracy of the media curl measurement.

20 Claims, 3 Drawing Sheets

DUAL CROSS BEAM SENSOR SYSTEM AND METHOD FOR MEASURING LEAD EDGE AND/OR TRAIL EDGE MEDIA CURL

TECHNICAL FIELD

Embodiments are generally related to rendering devices such as, printers, multi-function devices, photocopy machines, fax machines and the like. Embodiments are also related to curl detection sensors employed in the context of rendering devices. Embodiments are additionally related to the measurement of lead edge and/or trail edge media curl.

BACKGROUND OF THE INVENTION

Media curl is frequently considered one of the root causes of paper jams in paper handling and registration errors during rendering, and can be exacerbated by high-density images and plural color rendering issues. Media curl can be induced by several factors such as, for example, relative humidity, paper weight, paper size, sides imaged or the amount of data contained with a particular digital image.

Sheet curling can occur even in the context of unprinted sheets of paper due to changes in ambient humidity or the moisture content of the paper. Sheet curling can interfere with proper sheet feeding, causing sheet feeding jams, delays, misfeeds or registration errors. Sheet curling can cause media to have direct contact with printing cartridges and to damage the cartridges. If sheet curl is present in the output, it can interfere with proper stacking or other finishing operations. The amount of moisture in the sheet of paper can drastically change from the rendering process itself, to cause or exacerbate curl.

The sheet curl problem can also occur in duplex printing, when the sheets are re-fed or re-circulated for rendering imaging material on their second sides, especially if that involves a second pass of the sheet through a thermal fuser and/or higher density images on one side than the other. The media curl must be measured and controlled so that reliable marking can be achieved and damage to an ink cartridge can be prevented.

Various media curl sensors and control systems are known in the electro photographic rendering arts. Such prior art systems typically employ a single cross beam sensor for detecting the height/curl of the media. Such a sensor needs the nominal media transport speed as an input for the measurement of the paper curl, and an inaccurate nominal speed may lead to inaccurate curl readings. Also, such systems do not provide an effective mechanism and/or technique for measuring both the speed and the media curl height when the media passes the sensor.

Based on the foregoing, it is believed that a need exists for a dual cross beam sensor system and an improved method for measuring a lead edge and/or trail edge media curl. A need also exists for simultaneously measuring a true media speed and a curl height, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved lead edge and/or trail edge curl sensor system and method.

It is another aspect of the disclosed embodiments to provide for a dual cross beam sensor system and method for measuring a lead edge and/or a trail edge media curl.

It is further aspect of the disclosed embodiment to provide for an improved system and method for simultaneously measuring a true media speed and a curl height to enhance the accuracy of the curl measurement.

The aforementioned aspects and other objectives and advantages can now be achieved as described herein. A system and method for measuring a lead edge and/or a trail edge media curl utilizing a dual cross beam sensor is disclosed. The disclosed dual cross beam sensor can be configured to include a pair of, or up to two pairs of, emitters and one or more detectors (e.g., four detectors) positioned sequentially in a media path so that the media (e.g., paper, photo media and printing media, etc) passes via a dual cross beams (e.g., four beams). Timing data with respect to the media can be measured as the media crosses via the dual cross beam sensor from a leading edge and/or trailing edge. A true instantaneous media speed and a curl height (i.e., media tip height or media curvature) can be simultaneously calculated from the timing data associated with the lead edge/trail edge with respect to each cross beam point. An average curl height can be then calculated to enhance the accuracy of the media curl measurement.

The dual cross beam sensor has a comparatively low cost of construction as the sensor can be realized with two emitters and four detectors/receivers. The first emitter and a second emitter can be aligned in such a way that the light beams from the first emitter and the second emitter cross at the media transport path. The detectors can be provided on the either side of the media path and aligned to receive the light beams from the emitters. The media enters the dual cross beam sensor on a left side or right side and proceeds via a series of drive and nips, transport belts or baffles during which the lead edge/trail edge curl signal can be obtained. The timing data can be employed to calculate the media speed and the multiple media curvature. The curl height can be measured each time the media crosses the dual cross beam sensor and the media speed variation will not affect the curl height measurement.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
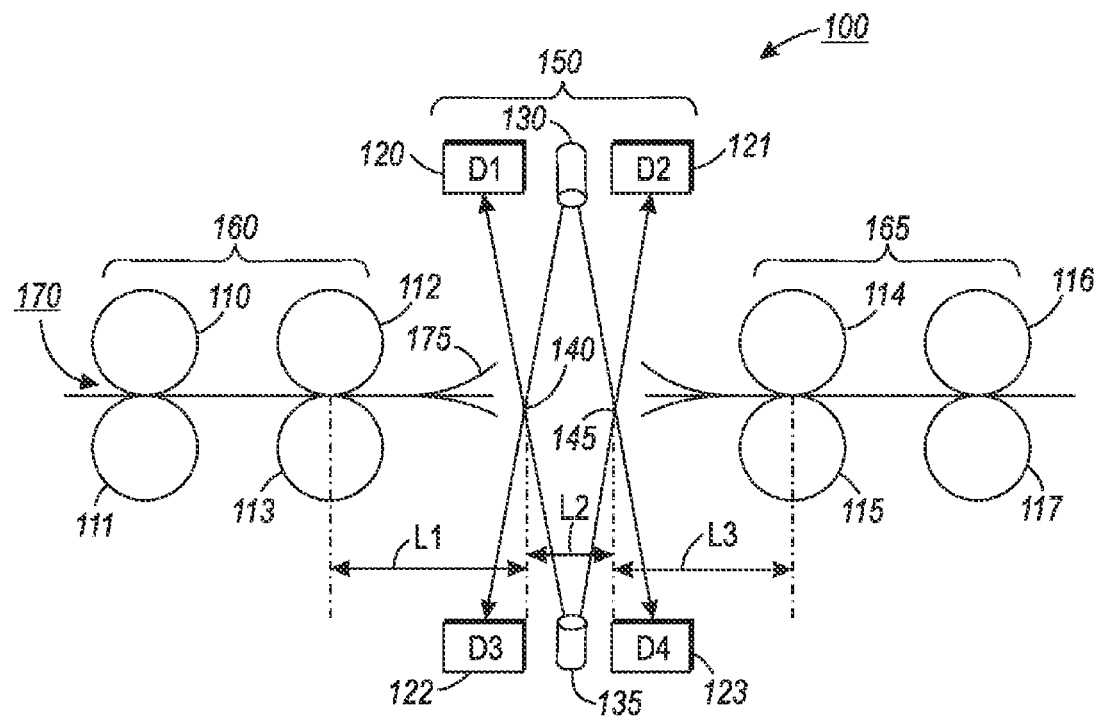
FIG. 1 illustrates a schematic diagram depicting a media lead edge and/or trail edge curl measurement system equipped with a dual cross beam sensor, in accordance with the disclosed embodiments.

FIG. 1 illustrates a schematic diagram depicting a media lead edge and/or trail edge curl measurement system 100 equipped with a dual cross beam sensor 150, in accordance with the disclosed embodiments. The curl measurement system 100 can be implemented in the context of measuring the leading edge and/or the trail edge curl of a transport media substrate in a marking engine, such as paper or transparencies in a xerographic rendering device. Note that as utilized herein, the term rendering device may refer to an apparatus or system such as a printer, fax machine, copy machine, etc., and/or a combination thereof. The curl measurement system 100 generally includes the dual beam sensor 150, either a lead edge constraint 160, or a trail edge constraint 165 or both a lead edge constraint 160 and a trail edge constraint 165.

The lead edge constraint 160 further includes nip formed by rollers 110 and 111, which can be positioned on opposite sides of a media path 170 in order to drive a media 175 towards the dual cross beam sensor 150. Additionally, nip formed by rollers 112 and 113 can be positioned between the nip formed by rollers 110 and 111 and the dual cross beam sensor 150. The media 175 travels between the constraint rollers 112 and 113. The term 'media' generally refers to sheets of paper or other material receiving marking images. For reference, the media may be described as having a leading edge, referring to the edge of the paper first to exit the rendering device. The edge of the paper last to leave the rendering device is called the trailing edge.

The trailing edge constraint 165 functions in a manner that is similar to the lead edge constraint 160. The trailing edge constraint 165 holds the media 175 as it exits the dual cross beam sensor 150 such that the trailing edge curl of the media 175 can be accurately measured. The trailing edge constraint 165 includes nip formed by rollers 116 and 117 positioned on opposite sides of the media path 170 wherein the media 175 can be pulled forward after exiting the dual cross beam sensor 150. Between the dual cross beam sensor 150 and nip formed by rollers 116 and 117 are positioned the trailing edge constraint nip formed by rollers 114 and 115. The media 175 enters the dual cross beam sensor 150 on a left side or a right side and proceeds through a series of drive and nips, transport belts or baffles (not shown). The lead edge constraint 160 constrains the edge of the substrate media 175 such that the dual cross beam sensor 150 is able to accurately measure the sheet media curl. The process direction of the substrate media 175 is indicated by arrow 170 in FIG. 2.

The dual cross beam sensor 150 can be configured to include two emitters 130 and 135 that can be disposed on the opposite sides of the transport media path 170. The emitters 130 and 135 can be employed to generate a pair of beams to form dual cross point 140 and 145. Located above and below the transport media path 170 are the four detectors D1 120, D2 121, D3 122 and D4 123 which monitor the beams emitted by the emitters 130 and 135 and report the time when beams are changed status from blocked to unblocked or from unblocked to blocked.

Figure 2:
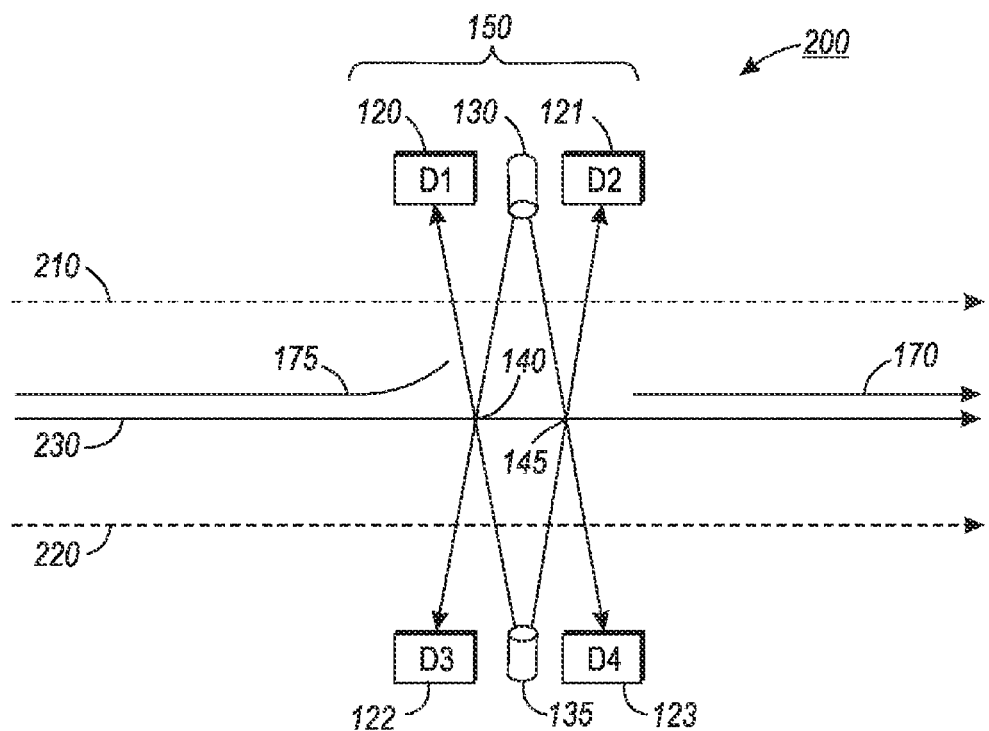
FIG. 2 illustrates a schematic diagram of a dual cross beam sensor, in accordance with the disclosed embodiments.

FIG. 2 illustrates a schematic diagram 200 of the dual cross beam sensor 150, in accordance with the disclosed embodiments. Note that in FIGS. 1-4, identical or similar parts are generally indicated by identical reference numerals. A lead edge/trail edge curl signal can be measured as the media 175 crosses via the dual cross beam sensor 150 positioned sequentially in the media path 170. The dual cross beam sensor 150 includes the pair of emitters 130 and 135 and four detectors D1 120, D2 121, D3 122 and D4 123 positioned sequentially in the media path 170 so that a media 175 passes via the dual cross beams. Note that there are four beams in the dual cross sensor system. The emitters 130 and 135 can be disposed on the opposite sides of the transport media path 170. The light emitter 130 can be aligned such that a light beam emitted is directed towards the detectors D1 120 and D2 121. The light emitter 135 can be aligned such that an emitted light beam is directed towards the detectors D3 122 and D4 123.

Light emitters 130 and 135 can be mounted such that the light beams from the light emitters 130 and 135 cross the transport media path 170 at some specific angle. Both light emitters 130 and 135 can be positioned such that the media 175 will pass through the dual cross light beams as it transverses the dual cross beam sensor 150. A positive curl associated with the media 175 is indicated by arrow 210. The positive curl can constitute any curl of the leading edge of the media 175 in the positive direction towards arrow 210. Negative curl can be defined similarly in the negative direction as shown by arrow 220. In FIG. 2, the media 175 is shown with a slight positive curl for illustrative purposes only.

The dual cross beam sensor 150 operates by measuring any time difference between interruptions of the light beams from the light emitters 130 and 135 as detected at the detectors D1 120, D2 121, D3 122 and D4 123. The media 175 traveling on the transport path 170 with zero curl of the leading edge can pass through the light beams of the dual cross sensor from the light emitters 130 and 135, interrupting the light beams sensed at the detectors D1 120, D2 121, D3 122 and D4 123. The media 175 with the positive curl of the leading edge can interrupt the light beams from the light emitters 130 and 135 as sensed at detectors D1 120, D2121, D3 122 and D4 123. Similarly, media 175 with a negative leading edge curl—will also interrupt the light beam from the light emitter 130 and 135 as sensed at the detectors D1 120, D2 121, D3 122 and D4 123. The time differences of the interruptions differ as the amount of curl of the media changes.

The timing data as illustrated in FIG. 1 at L1, L2 and L3, with respect to the media 175 can be measured as the media 175 passes the four beams of the dual cross beam sensor 150. A true instantaneous media speed can be measured and a media tip height can be calculated from the arrival/departure time of the lead edge/trail edge with respect to each beam. The media speed variation will not affect the media tip height measurement. Note that as utilized herein the term "media tip height" can refer to a curled height and/or a media curvature. The tip height can be measured each time the media 175 cross one of the single cross of the dual cross beam sensor 150 and an average of the tip height measurements can be calculated to achieve more accurate media tip height representation.

Figure 3:
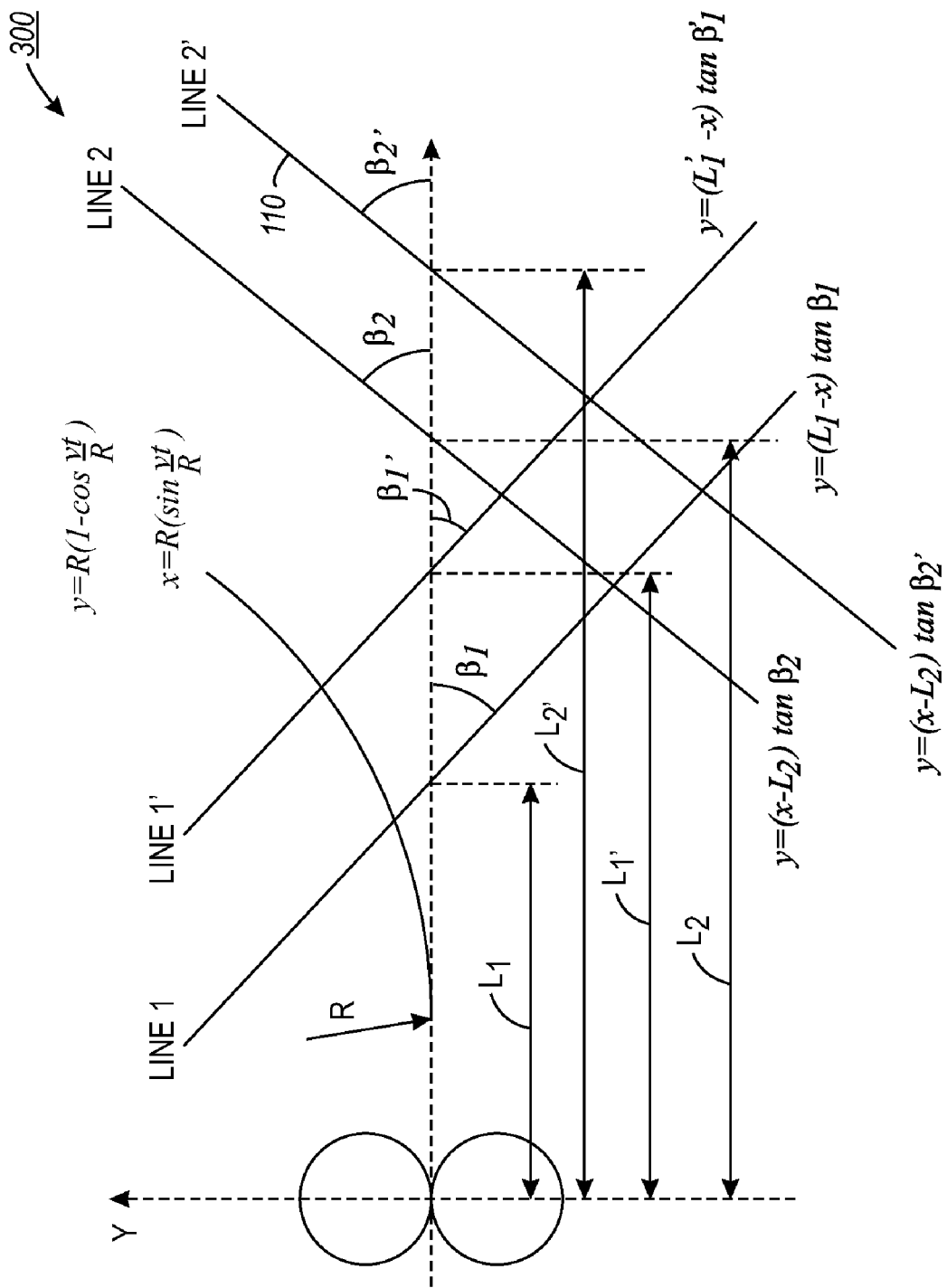
FIG. 3 illustrates a schematic diagram of the dual cross beam sensor for determining a true media speed and media tip height, in accordance with the disclosed embodiment.

FIG. 3 illustrates a schematic diagram 300 of the dual cross beam sensor 150 for determining the true media speed and the multiple media tip height, in accordance with the disclosed embodiment. Timing data with respect to the media 175 can be measured as the media 175 passes the dual cross beam sensor 150 from the leading edge and/or from the trailing edge. The timing data associated with line/beam 1, 1', 2, 2' as illustrated in FIG. 3, can be represented as $t_1$, $t_1'$, $t_2$, and $t_2'$, respectively. The true media speed can be calculated utilizing the values of $L_1$, $L_1'$, $L_2$, and $L_2'$, where $L_1$, $L_1'$, $L_2$, and $L_2'$ represent the distances from the center of constraint nip (lead edge or trail edge) to the locations where the beams/lines will cross the line extended from the nip center, and the timing data, as shown in equation (1), $$v = \frac{L_1' - L_1}{t_1' - t_1} \text{ or } v = \frac{L_2' - L_2}{t_2' - t_2} \quad (1)$$

$L_1, L_1', L_2,$ and $L_2'$ represents the length from the constraint nip to the point of intersection of line 1, 1', 2, 2' with the media path 170, respectively. The media tip heights with respect to the first and second cross of the dual cross beam sensor can be calculated, as indicated in equation (2) as follows:

$$\bar{y}_1 = \frac{(L_1 - L_2)(t_1' - t_1) + (L_1' - L_1)(t_2 - t_1)}{(t_1' - t_1)[\tan(\pi/2 - \beta_1) + \tan(\pi/2 - \beta_2)]} \quad (2)$$

or $$\bar{y}_2 = \frac{(L_1' - L_2')(t_2' - t_2) + (L_2' - L_2)(t_2' - t_1')}{(t_2' - t_2)[\tan(\pi/2 - \beta_1') + \tan(\pi/2 - \beta_2')]}$$

The angle $\beta_1, \beta_1', \beta_2$ and $\beta_2'$ represent the angle between the transport media path 170 and the lines 1, 1', 2, 2' respectively. As given in equation (2), the calculation of the media tip heights does not use the nominal media speed, i.e. the media speed variation will not affect the media tip height measurement. Each time media 175 crosses the dual cross beam sensor 150 two media tip height measurements can be determined, one from each cross of the beam sensor. The average of the tip height measurements and the average of the media speed can be calculated to achieve more accurate tip height (curl) representation as illustrated below in equations (3) and (4).

$$\bar{y}_1 + \bar{y}_2 = \frac{(L_1 - L_2)(t_1' - t_1) + (L_1' - L_1)(t_2 - t_1)}{(t_1' - t_1)[\tan(\pi/2 - \beta_1) + \tan(\pi/2 - \beta_2)]} + \quad (3)$$

$$\frac{(L_1' - L_2')(t_2' - t_2) + (L_2' - L_2)(t_2' - t_1')}{(t_2' - t_2)[\tan(\pi/2 - \beta_1') + \tan(\pi/2 - \beta_2')]}$$

$$v = \frac{L_1' - L_1}{2(t_1' - t_1)} + \frac{L_2' - L_2}{2(t_2' - t_2)} \quad (4)$$

Figure 4:
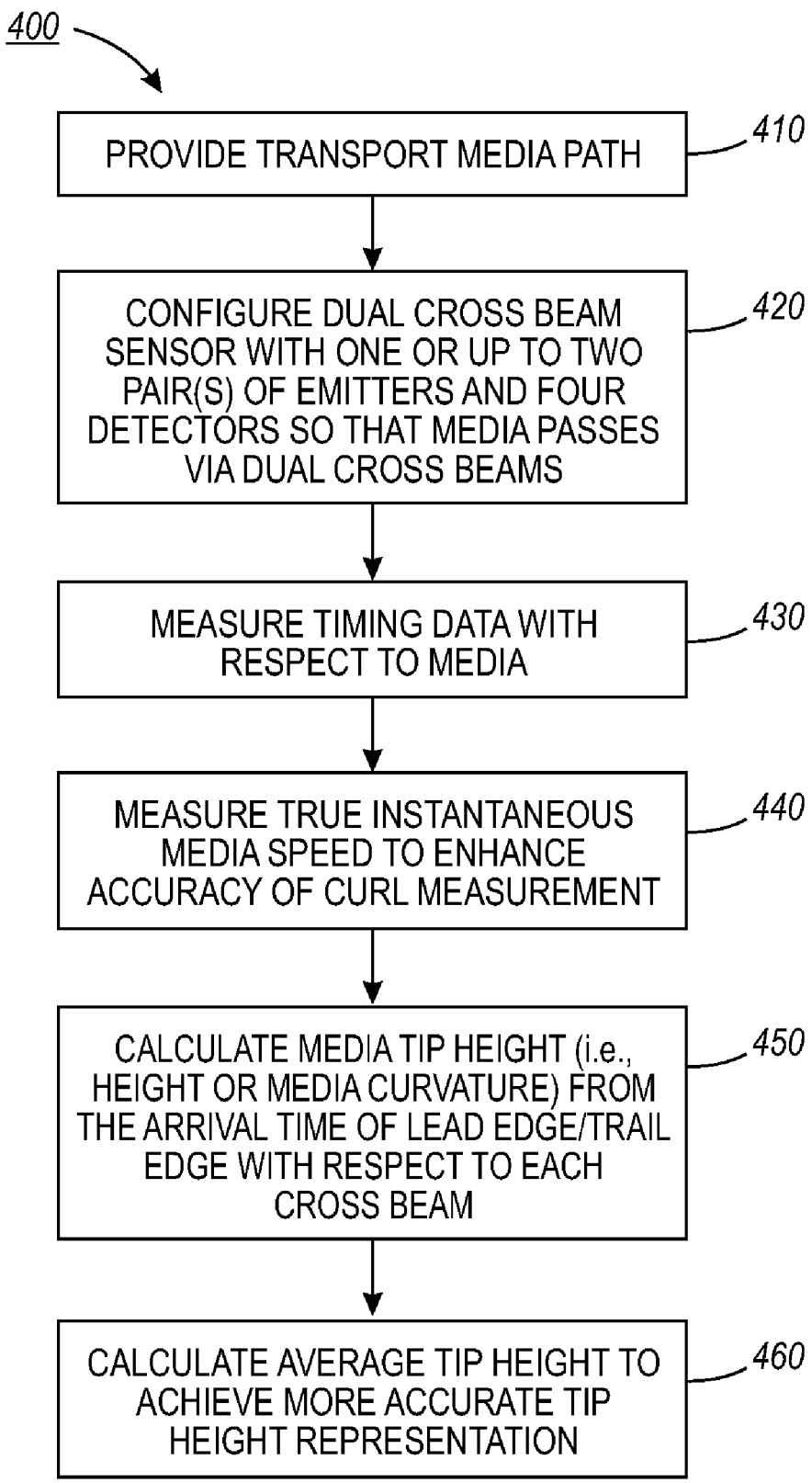
FIG. 4 illustrates a flow chart of operations illustrating logical operational steps of a method for measuring a lead edge and/or a trail edge media curl utilizing the dual cross beam sensor, in accordance with the disclosed embodiments.

FIG. 4 illustrates a flow chart of operations illustrating logical operational steps of a method 400 for measuring a lead edge and/or a trail edge media curl utilizing the dual cross beam sensor 150, in accordance with the disclosed embodiments. Initially, a transport media path 170 can be provided, as depicted at block 410. Note that the transport media path can be form to measure a leading edge curl or form to measure the trailing edge curl associated with the media 175. Thereafter, the dual cross beam sensor 150 with the pair of emitters 130 and 135 and four detectors D1 120, D2 121, D3 122 and D4 123 can be configured so that media 175 passes via the beams of the dual cross beam sensor 150, as illustrated at block 420. Timing data with respect to the media 175 can also be measured as the media 175 crosses via the dual cross beam sensor 150 positioned sequentially in the media path 170, as depicted at bock 430.

Thereafter, as illustrated at block 440, true instantaneous media speed can be measured. A media tip height (i.e., curled height or media curvature) can be calculated from the arrival/departure time of the lead edge/trail edge with respect to each beam of the dual cross sensor 150, as depicted at block 450. An average of the tip height measurements can be calculated to achieve more accurate tip height (curl) representation, as indicated at block 460. The dual cross beam sensor 150 can be realized with two emitters 130 and 135 and four detectors/receivers D1 120, D2 121, D3 122 and D4 123 to reduce cost compared to two full cross-beam sensors (four emitters and four detectors). The proposed system 100 actually produces two curl measurements that may be combined to improve accuracy further over that of a single cross-beam sensor.

Based on the foregoing, it can be appreciated that embodiments are disclosed, including a method for measuring media curl. Such a method can include, for example, the step of positioning a dual cross beam sensor 150 having at least one pair of emitters 130 and 135 and a plurality of detectors D1 120, D2 121, D3 122 and D4 123 in a media path 170 so that a media 175 passes via four beams generated by the dual cross beam sensor 150. Such a method can further include the step of measuring timing data with respect to the media 175 as the media 175 crosses via the dual cross beams an edge associated with the media 175. Additionally, such a method can include the step of simultaneously calculating a true instantaneous media speed and a curl height based on the timing data with respect to each cross beam in order to thereafter calculate an average curl height, thereby enhancing an accuracy of the curl height measurement.

In other embodiments of such a method, a step can be implemented for measuring the media speed and the curl height as the media 175 crosses via the dual cross beams from a leading edge. In still other embodiments of such a method, a step can be implemented for measuring the media speed and the curl height as the media crosses via the dual cross beams from a trailing edge. Additionally, in other embodiments of such a method, a step can be implemented for positioning the at least one pair of emitters 130 and 135 in such a way that a light beam from the pair of emitters 130 and 135 cross at the media path 170. In yet other embodiments of such a method, a step can be implemented for aligning the plurality of detectors on either side of the media path 170 to receive the light beam from the at least one pair of emitters 130 and 135. Additionally, in some embodiments, the detectors D1 120, D2 121, D3 122 and D4 123 can include two or more detectors. In yet other embodiments, the detectors D1 120, D2 121, D3 122 and D4 123 can include four or more detectors. In still other embodiments of such a method the emitters 130 and 135 can include two or more emitters. In yet other embodiments of such a method, the emitters 130 and 135 can include four or more emitters.

It can be further appreciated, based on the foregoing, that in another embodiment, a system is disclosed for measuring media curl. Such a system can include, for example, a dual cross beam sensor 150 having at least one pair of emitters 130 and 135 and a plurality of detectors D1 120, D2 121, D3 122 and D4 123 in a media path 170 so that a media 175 passes via four beams generated by the dual cross beam sensor 150. Such a system can further include a measuring device to measure timing data with respect to the media 175 as the media 175 crosses via the dual cross beams an edge associated with the media 175. Additionally, such a system can include a processor to simultaneously calculate a true instantaneous media speed and a curl height based on the timing data with respect to each cross beam in order to thereafter calculate an average curl height, thereby enhancing an accuracy of the curl height measurement.

In other embodiments of such a system, the measuring device can be configured to further measure the media speed and the curl height as the media 175 crosses via the dual cross beams from a leading edge. In still other embodiments of such a system, the measuring device can further measure the media speed and the curl height as the media crosses via the dual cross beams from a trailing edge. Additionally, in other embodiments of such a system, the emitters 130 and 135 (e.g., one or more pairs of emitters) can be positioned in such a manner that a light beam from the pair of emitters 130 and 135 cross at the media path 170. In other embodiments of such a system, the detectors D1 120, D2 121, D3 122 and D4 123 can be aligned on either side of the media path 170 to receive the light beam from the emitters 130 and 135. In yet other embodiments of such a system, the detectors D1 120, D2 121, D3 122 and D4 123 can include two or more detectors, in still other embodiments of such a system, the detectors D1 120, D2 121, D3 122 and D4 123 can include four or more detectors. In other embodiments of such a system the emitters 130 and 135 can include two or more emitters, while in yet other embodiments such a system, the emitters 130 and 135 can include four or more emitters.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for measuring media curl, said method comprising:
    positioning a dual cross beam sensor having at least one pair of emitters and a plurality of detectors in a media path so that a media passes via dual cross beams generated by said dual cross beam sensor;
    measuring timing data with respect to said media as said media crosses via said dual cross beams an edge associated with said media; and
    simultaneously calculating a true instantaneous media speed and a curl height based on said timing data with respect to each cross beam in order to thereafter calculate an average curl height, thereby enhancing an accuracy of said curl height measurement.

2. The method of claim 1 further comprising measuring said media speed and said curl height as said media crosses via said dual cross beams from a leading edge.

3. The method of claim 1 further comprising measuring said media speed and said curl height as said media crosses via said dual cross beams from a trailing edge.

4. The method of claim 1 further comprising positioning said at least one pair of emitters in such a way that a light beam from said pair of emitters cross at said media path.

5. The method of claim 1 further comprising aligning said plurality of detectors on either side of said media path to receive said light beam from said at least one pair of emitters.

6. The method of claim 5 further comprising configuring said plurality of detectors to comprise at least two detectors.

7. The method of claim 5 further comprising configuring said plurality of detectors to comprise at least four detectors.

8. The method of claim 5 further comprising configuring said at least one pair of emitters to comprise at least two emitters.

9. The method of claim 5 further comprising configuring said at least one pair of emitters to comprise at least four emitters.

10. A system for measuring media curl, said system comprising:
    a dual cross beam sensor having at least one pair of emitters and a plurality of detectors in a media path so that a media passes via dual cross beams generated by said dual cross beam sensor;
    a measuring device to measure timing data with respect to said media as said media crosses via said dual cross beams an edge associated with said media; and
    a processor to simultaneously calculate a true instantaneous media speed and a curl height based on said timing data with respect to each cross beam in order to thereafter calculate an average curl height, thereby enhancing an accuracy of said curl height measurement.

11. The system of claim 10 wherein said measuring device further measures said media speed and said curl height as said media crosses via said dual cross beams from a leading edge.

12. The system of claim 10 wherein said measuring device further measures said media speed and said curl height as said media crosses via said dual cross beams from a trailing edge.

13. The system of claim 10 wherein said at least one pair of emitters is positioned in such a manner that a light beam from said pair of emitters cross at said media path.

14. The system of claim 10 wherein said plurality of detectors is aligned on either side of said media path to receive said light beam from said at least one pair of emitters.

15. The system of claim 14 wherein said plurality of detectors comprises at least two detectors.

16. The system of claim 14 wherein said plurality of detectors comprises at least four detectors.

17. The system of claim 14 wherein said at least one pair of emitters comprises at least two emitters.

18. The system of claim 14 wherein said at least one pair of emitters comprises at least four emitters.

19. A system for measuring media curl, said system comprising:
    a dual cross beam sensor having at least one pair of emitters and a plurality of detectors in a media path so that a media passes via dual cross beams generated by said dual cross beam sensor;
    a measuring device to measure timing data with respect to said media as said media crosses via said dual cross beams an edge associated with said media; and
    a processor to simultaneously calculate a true instantaneous media speed and a curl height based on said timing data with respect to each cross beam in order to thereafter calculate an average curl height, thereby enhancing an accuracy of said curl height measurement, and wherein said measuring device further measures said media speed and said curl height as said media crosses via said dual cross beams from a leading edge or a trailing edge.

20. The system of claim 19 wherein:
    said at least one pair of emitters is positioned in such a manner that a light beam from said pair of emitters cross at said media path; and
    said plurality of detectors is aligned on either side of said media path to receive said light beam from said at least one pair of emitters.

* * * * *